S. R. REYNOLDS.
MACHINE FOR BENDING WIRE.
APPLICATION FILED FEB. 21, 1921.
1,418,470.
Patented June 6, 1922.
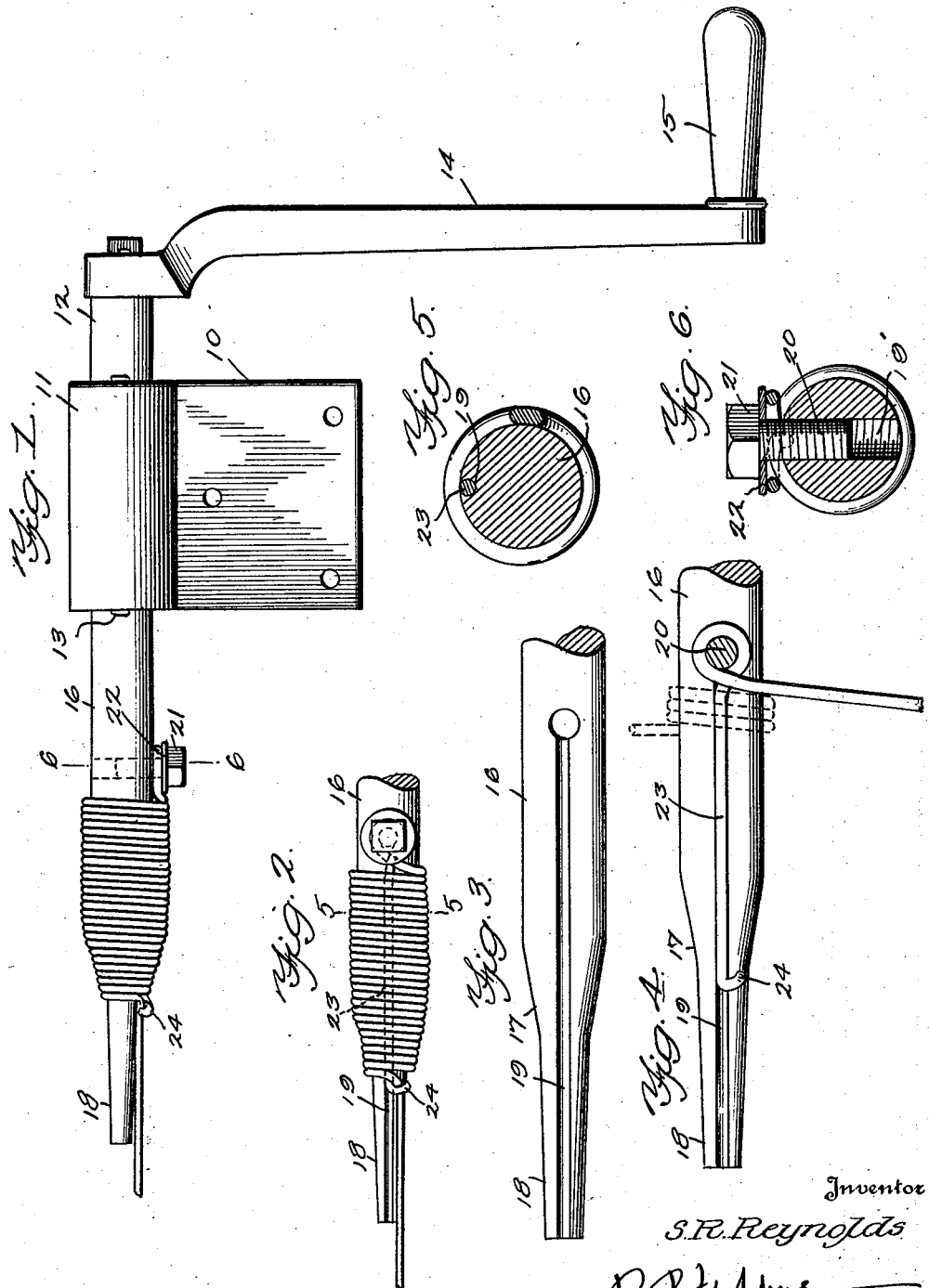

UNITED STATES PATENT OFFICE.

STEPHEN R. REYNOLDS, OF ENID, MONTANA.

MACHINE FOR BENDING WIRE.

1,418,470. Specification of Letters Patent. Patented June 6, 1922.

Application filed February 21, 1921. Serial No. 446,744.

*To all whom it may concern:*

Be it known that STEPHEN R. REYNOLDS, a citizen of the United States, residing at Enid, in the county of Richland and State of Montana, has invented certain new and useful Improvements in a Machine for Bending Wire, of which the following is a specification.

My invention relates to a machine adapted to shape or bend wire for the production of the cylinder or barrel of an animal dosing device, which device is shown and described in my co-pending application for an animal dosing device, filed February 21, 1921, Serial No. 446,743.

An important object of the invention is to provide a machine of the above mentioned character, which is of simple construction, and is adapted to do the work quickly and conveniently.

Other objects and advantages of the invention will be apparent in the course of the following description.

In the accompanying drawings forming a part of this specification and in which like numerals are employed to designate like parts throughout the same, Figure 1 is a side elevation of a machine embodying my invention, showing the work thereon, Figure 2 is a plan view of the same, parts broken away, Figure 3 is a fragmentary plan view of the spindle or mandrel, Figure 4 is a similar view, showing the wire in the process of bending, Figure 5 is a transverse section taken on line 5—5 of Figure 2, and, Figure 6 is a similar view taken on line 6—6 of Figure 2.

In the drawings, wherein for the purpose of illustration is shown a preferred embodiment of my invention, the numeral 10 designates a standard, which may be vertically arranged, and rigidly secured to a suitable support. This standard carries at its upper end a bearing or sleeve 11, as shown.

Rotatable within the bearing 11 is a preferably horizontal shaft 12, which may be held against longitudinal displacement by any suitable means, pins 13 passing transversely through the shaft, and contacting with the bearing 11, being employed for this purpose. Any suitable means, either power driven or manual, may be employed to rotate the shaft 12, and I have shown, for the purpose of illustration, a handle 14, or crank, carrying a hand grip 15.

The forward end portion of the shaft 12 constitutes a spindle or mandrel, designated at 16, and this spindle preferably has its forward end 17 tapered forwardly, and continuing in a reduced extension 18, also preferably tapering forwardly slightly. The mandrel is circular in cross section throughout its length.

The mandrel is provided with a longitudinal groove 19, extending from its forward end to a transverse opening 19', which is screw-threaded.

The numeral 20 designates a combined looping and holding element, preferably in the form of a screw or bolt, engaging within the opening 19', and having a head 21, and preferably provided with a washer 22.

In operation, in the production of the barrel shown in my co-pending application, herein referred to, a section of wire 23 is arranged within the groove 19, an open hook 24 being preferably previously formed upon the free end of the wire. The screw 20 may be suitably loosened, so that a portion of the wire may now be looped about the screw, beneath the washer 22, the wire then extending over the straight portion of the wire in the groove 19. The screw 20 is now tightened up to securely clamp the wire against slipping. The mandrel is now rotated clockwise, and the wire is wound thereon, exteriorly of the longitudinal portion of the wire, in the groove 19, forming the closely assembled coils. The winding is continued until the hook 24 is reached, then the wire is then passed beneath or within this hook. The operation of the machine is then completed, the screw 20 may be removed, and the barrel thus produced withdrawn from the mandrel by a longitudinal movement thereof. The hook 24, extending inwardly may now be completely closed. It will thus be found that the barrel of the dosing device is produced, with the horizontal extension, the longitudinal guide element extending through the barrel, such guide element being attached to the stem or supporting rod of the barrel.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, what I claim is:

1. A machine of the character described, comprising a support, a spindle carried by the support, said spindle having a longitudinal groove, a looping element carried by the spindle and arranged near the groove, and means to turn the spindle.

2. A machine of the character described, comprising a support, a spindle carried by the support, said spindle having a longitudinal groove, a combined looping and clamping element adjustably carried by the spindle near the inner end of said groove, and means to turn the spindle.

3. A machine of the character described, comprising a support, a spindle carried by the support and having a substantially straight groove extending longitudinally thereof, and a screw-threaded opening at the inner end of the groove and arranged transversely of the spindle, and a looping pin having screw-threaded engagement within the screw-threaded opening.

4. A machine of the character described, comprising a support, a spindle carried thereby and tapering forwardly, a substantially straight groove extending longitudinally of the spindle, said spindle having a transverse screw-threaded opening at the inner end of said groove, a looping pin engaging within the screw-threaded opening, and means to turn the spindle.

In testimony whereof I affix my signature.

STEPHEN R. REYNOLDS.